(12) United States Patent
Lim

(10) Patent No.: US 9,465,780 B2
(45) Date of Patent: Oct. 11, 2016

(54) USER TERMINAL DEVICE AND SCROLL METHOD SUPPORTING HIGH-SPEED WEB SCROLL OF WEB DOCUMENT

(71) Applicant: SK PLANET CO., LTD., Seongnam-si, Gyeonggi-do (KR)

(72) Inventor: Sang Seok Lim, Yongin-si (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 270 days.

(21) Appl. No.: 14/240,544
(22) PCT Filed: Jul. 31, 2013
(86) PCT No.: PCT/KR2013/006914
§ 371 (c)(1),
(2) Date: Feb. 24, 2014
(87) PCT Pub. No.: WO2014/058146
PCT Pub. Date: Apr. 17, 2014

(65) Prior Publication Data
US 2016/0012022 A1    Jan. 14, 2016

(30) Foreign Application Priority Data

Oct. 10, 2012  (KR) .......................... 10-2012-0112151
Oct. 30, 2012  (KR) .......................... 10-2012-0121237

(51) Int. Cl.
*G06F 17/00* (2006.01)
*G06F 17/22* (2006.01)
(Continued)

(52) U.S. Cl.
CPC ......... *G06F 17/2247* (2013.01); *G06F 17/212* (2013.01); *G06F 17/2205* (2013.01);
(Continued)

(58) Field of Classification Search
CPC ...................... G06F 17/2247; G06F 17/30902
USPC ........................................................ 715/234
See application file for complete search history.

(56) References Cited

U.S. PATENT DOCUMENTS 7,466,875 B1    12/2008   Siegel et al.
2006/0280373 A1  12/2006   Uchida
(Continued)

FOREIGN PATENT DOCUMENTS

CA    2756537 A1    10/2012
CN    102073502 A    5/2011
(Continued)

OTHER PUBLICATIONS

Japanese Office Action for application No. 2014-540986 dated Sep. 30, 2014.
(Continued)

*Primary Examiner* — Keith Bloomquist
(74) *Attorney, Agent, or Firm* — Hauptman Ham, LLP

(57) ABSTRACT

Disclosed is a user terminal device and a scroll method supporting high-speed web scroll of a web document. According to an embodiment of the present invention, there is provided a web scroll system including a user terminal device, the system including: a web document providing apparatus for storing the web document configured to include HyperText Markup Language (HTML) and providing the web document to the user terminal device according to connection of the user terminal device; and the user terminal device having a processor for connecting to the web document providing apparatus and receiving the web document, parsing the provided web document and converting into data having a structure formed in a shape of a tree, loading data that will be output on a display means among the converted data on video output memory as display output tree data, and providing the converted data to a web application process.

19 Claims, 9 Drawing Sheets

(51) Int. Cl.
*G09G 5/34* (2006.01)
*G06F 17/21* (2006.01)
*G06F 17/27* (2006.01)
*G06F 3/14* (2006.01)

(52) U.S. Cl.
CPC .......... *G06F17/227* (2013.01); *G06F 17/272* (2013.01); *G09G 5/34* (2013.01); *G06F 3/14* (2013.01); *G09G 2370/027* (2013.01)

(56) References Cited

U.S. PATENT DOCUMENTS

| | | | |
|---|---|---|---|
| 2011/0197125 A1 | 8/2011 | Sun | |
| 2011/0258532 A1 | 10/2011 | Ceze et al. | |
| 2011/0302510 A1 | 12/2011 | Harrison et al. | |
| 2012/0110437 A1* | 5/2012 | Pan | G06F 17/30902 715/235 |
| 2012/0260157 A1* | 10/2012 | Zhu | G06F 17/30902 715/234 |
| 2013/0145255 A1* | 6/2013 | Zheng | G06F 17/30867 715/234 |
| 2013/0155069 A1* | 6/2013 | Borders | G06T 11/20 345/441 |
| 2015/0074513 A1 | 3/2015 | Liang et al. | |

FOREIGN PATENT DOCUMENTS

| | | |
|---|---|---|
| CN | 102375851 A | 3/2012 |
| CN | 102693280 A | 9/2012 |
| JP | 2007004232 A | 1/2007 |
| JP | 2007017945 A | 1/2007 |
| JP | 2007164630 A | 6/2007 |
| KR | 1020030022756 A | 3/2003 |
| KR | 1020100055857 A | 5/2010 |
| WO | 2012022044 A1 | 2/2012 |

OTHER PUBLICATIONS

International Search Report mailed Nov. 26, 2013 for PCT/KR2013/006914.

Haitao Yu, "Master dissertation", University of Electronic Science and Technology of China (UESTC), Dec. 15, 2011, 9 pages, No. 200820601040.

The Search Report for corresponding Singapore Patent Application No. 11201406773R issued on May 12, 2016, citing the above references.

* cited by examiner

USER TERMINAL DEVICE AND SCROLL METHOD SUPPORTING HIGH-SPEED WEB SCROLL OF WEB DOCUMENT

TECHNICAL FIELD

The present invention relates to a technique for displaying a web document configured to include a HyperText Markup Language (HTML) on a user terminal device, and particularly, relates to a technique for improving reaction of a user terminal device when a web document of a large size is displayed.

BACKGROUND ART

Web documents are generally expressed in a web document description language such as Java Script, XML or the like including HTML, and a web application executed in a user terminal device interprets the web document description language and displays the web document on a display means of the user terminal device.

With the advancement in the Internet and wired and wireless communication techniques, web documents are expanded from conventional text-oriented contents to web documents including multimedia contents such as a picture, a moving image and the like.

Accordingly, a system needs to be configured so that a web application executed in a user terminal device may stably process a web document configured of large-scale contents and user reaction may not be lowered.

In addition, a social network service is provided not in a way of setting an end of a web document, but in a way of loading a predetermined amount of the web document and then loading a subsequent amount if a user scrolls the web document up to the end of the amount.

FIG. 1 is a view showing a result of displaying a specific social network service on a mobile user terminal device, and if a web document is scrolled exceeding a predetermined amount 110, a following amount is loaded again, and this is continuously repeated.

In this case, there is a problem in that since the user terminal device continuously loads a web document exceeding a display screen shown to a user, a big load is placed on the memory capacity and data processing capability. Such a problem acts as a further severe problem in a mobile terminal device which is not a personal computer having memory of a large capacity.

DISCLOSURE OF INVENTION

Technical Problem

Therefore, the present invention has been made in view of the above problems, and it is an object of the present invention to provide a user terminal device and a method, which can scroll a web document in a speedy way.

Another object of the present invention is to provide a user terminal device and a method, which support a data structure and a data processing method for scrolling a web document in a speedy way.

Still another object of the present invention is to provide a user terminal device and a method, which can change a data structure and a data processing method for scrolling a web document according to complexity of the web document.

Technical Solution

To accomplish the above objects, according to one aspect of the present invention, there is provided a user terminal device including: a display unit for displaying an output result of a web application process; a video output memory unit for storing the output result displayed on the display unit; a memory unit for storing data including an intermediate operation result according to processing a process of a processor unit; and the processor unit for executing processes including the web application process, parsing a provided web document created in a web description language and converting into a DOM tree data having a structure formed in a shape of a tree, creating a render tree data having a structure the same as that of the converted DOM tree data, in which non-output nodes excluding display output nodes corresponding to data that will be output on a display means are configured as void nodes, storing the render tree data in the video output memory unit, and providing the render tree data to the web application process.

In addition, although the processor unit may store the DOM tree data in memory having a speed lower than that of the video output memory unit, it is not limited thereto.

In addition, if a request for changing the data that will be output on the display unit is received from the web application process, the processor unit may replace non-output nodes which do not output on the display unit any more among the display output nodes of the render tree data with void nodes, copy data that will be output on the display means among the DOM tree data to the render tree data, and then provide the render tree data to the web application process.

In addition, the processor unit may insert scroll mark nodes at data structure positions in the DOM tree data corresponding to the display output nodes of the render tree data.

In addition, the scroll mark nodes are nodes different from each other, including a start scroll mark node and an end scroll mark node.

According to another aspect of the present invention, there is provided a user terminal device including: a display unit for displaying an output result of a web application process; a video output memory unit for storing the output result displayed on the display unit; a memory unit for storing data including an intermediate operation result according to processing a process of a processor unit; and the processor unit for executing processes including the web application process, parsing a provided web document created in a web description language and converting into a DOM tree data having a structure formed in a shape of a tree, determining a ratio of text in the provided web document, and if the ratio exceeds a preset value, creating a render tree data having a structure the same as that of the converted DOM tree data, in which nodes excluding display output nodes corresponding to data that will be output on a display means are configured as void nodes, storing the render tree data in the video output memory unit, and providing the render tree data to the web application process, and if the ratio of text in the web document does not exceed the preset value, providing the DOM tree data to the web application process.

In addition, if the ratio of text in the web document exceeds the preset value, the processor unit may store the DOM tree data in memory having a speed lower than that of the video output memory unit.

In addition, if the ratio of text in the web document exceeds the preset value, the processor unit may insert scroll mark nodes at data structure positions in the DOM tree data corresponding to the display output nodes of the render tree data.

In addition, the scroll mark nodes are nodes different from each other, including a start scroll mark node and an end scroll mark node.

In addition, if the ratio of text in the web document exceeds the preset value and a request for changing data that will be output on the display unit is received from the web application process, the processor unit may replace non-output nodes which do not output on the display unit any more among the display output nodes of the render tree data with void nodes, copy data that will be output on the display means among the DOM tree data to the render tree data, and then provide the render tree data to the web application process.

According to still another aspect of the present invention, there is provided a web scroll system including a user terminal device, the system including: a web document providing apparatus for storing a web document created in a web description language and providing the web document to the user terminal device according to connection of the user terminal device; and the user terminal device having a processor for connecting to the web document providing apparatus and receiving the web document, parsing the provided web document created in a web description language and converting into a DOM tree data having a structure formed in a shape of a tree, creating a render tree data having a structure the same as that of the converted DOM tree data, in which non-output nodes excluding display output nodes corresponding to data that will be output on a display means are configured as void nodes, and providing the render tree data to a web application process.

In addition, the user terminal device may i) store the display non-output nodes in a preset storage space and load again the display non-output nodes on the DOM tree data when the web application process calls the display non-output nodes, or ii) receive only the display non-output nodes from the web application process and load again the display non-output nodes on the DOM tree data when the web application process calls the display non-output nodes.

According to another aspect of the present invention, there is provided a web document scrolling method of a user terminal device, the method including the steps of: (a) executing processes including a web application process and receiving a web document created in a web description language, by a processor unit; (b) parsing the web document and converting into a DOM tree data having a structure formed in a shape of a tree, by the processor unit; (c) creating a render tree data having a structure the same as that of the DOM tree data, in which non-output nodes excluding display output nodes corresponding to data that will be output on a display means are configured as void nodes, by the processor unit; and (d) loading the render tree data in video buffer memory and providing the render tree data to the web application process, by the processor unit.

In addition, in the step (b), the processor unit may additionally store the converted DOM tree data in memory having a speed lower than that of the video buffer memory.

In addition, in the step (c), the processor unit may further insert scroll mark nodes at data structure positions in the DOM tree data corresponding to the display output nodes of the render tree data.

In addition, the scroll mark nodes are nodes different from each other, including a start scroll mark node and an end scroll mark node.

In addition, in the step (d), if a request for changing the data that will be output on the display unit is received from the web application process, the processor unit may replace non-output nodes which do not output on the display unit any more among the display output nodes of the render tree data with void nodes, copy data that will be output on the display means among the DOM tree data to the render tree data, and then provide the render tree data to the web application process.

In addition, a ratio of text in the provided web document is determined, and the step (C) may be performed when the ratio exceeds a preset value.

According to another aspect of the present invention, there is provided a recording medium which can be read by an electronic device, the recording medium for recording a web document scroll method of a user terminal device as a program, the method including the steps of: (a) executing processes including a web application process and receiving a web document created in a web description language, by a processor unit; (b) parsing the web document and converting into a DOM tree data having a structure formed in a shape of a tree, by the processor unit; and (C) removing display non-output nodes excluding display output nodes corresponding to data that will be output on a display means from display output memory and providing the display output nodes to the web application process, by the processor unit, in which the display non-output nodes are nodes farther than a first distance from the display output nodes.

Advantageous Effects

According to the present invention, a user terminal device may scroll a web document in a speedy way.

In addition, according to the present invention, a data structure and a data processing method for scrolling a web document in a speedy way may be provided.

According to the present invention, a data structure and a data processing method for scrolling a web document may be changed depending on complexity of the web document.

Figure 1:
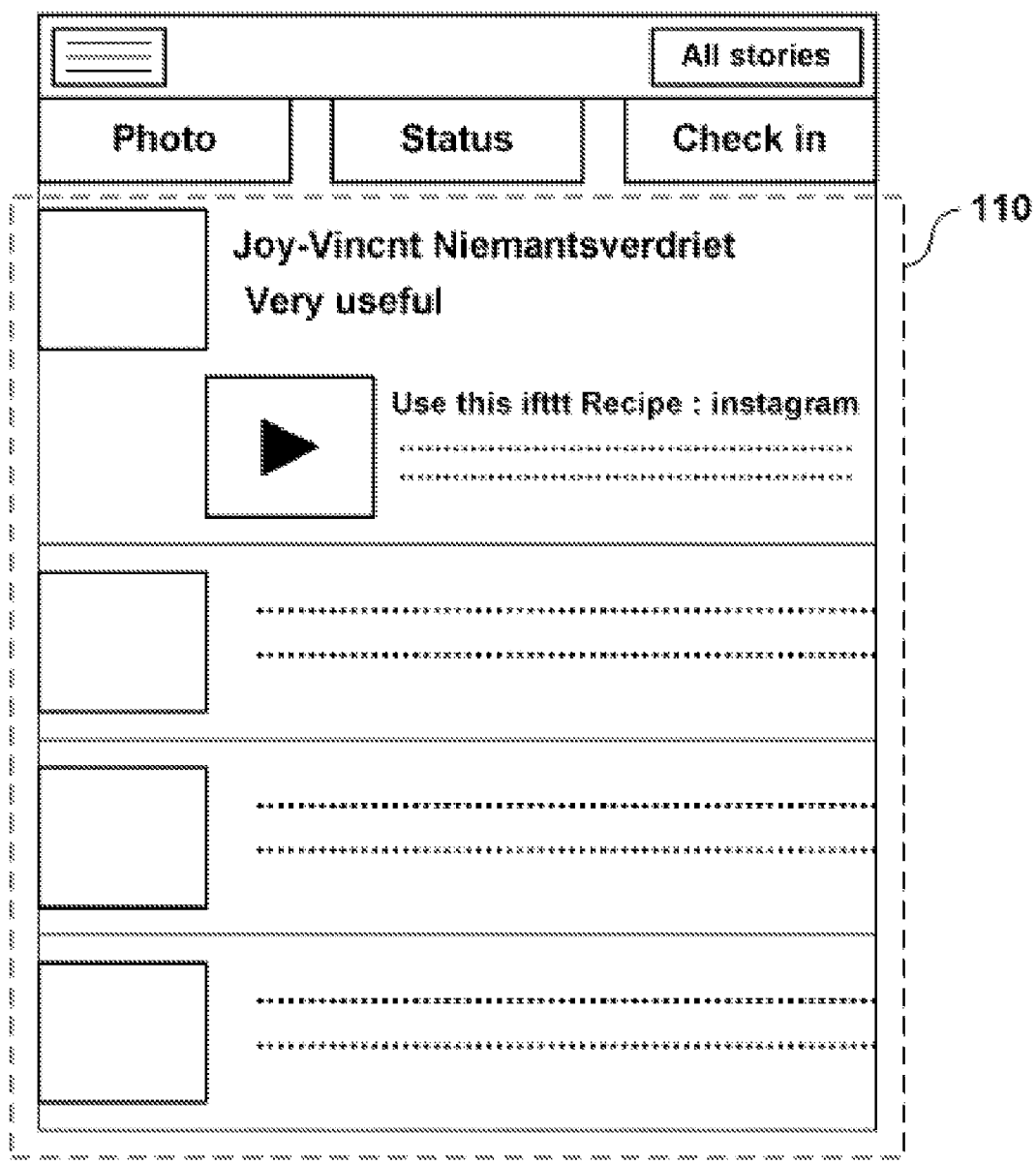
FIG. 1 is a view showing an embodiment of a service provided through a web of a conventional social network service.

| DESCRIPTION OF SYMBOLS |
| --- |
| 210: Web document providing device |
| 220:, 230, 240: user terminal device |
| 310: Display unit 320: Memory unit |
| 330: Video output memory unit 340: Processor unit |
| 610, 720, 810, 920: Display output node |
| 811, 812, 921, 922: Scroll mark node |
| 1010: Web document |
| 1020: Viewport |
| 1030: Display apparatus |
| 1040: First distance |

BEST MODE FOR CARRYING OUT THE INVENTION

The preferred embodiments of the present invention will be hereafter described in detail, with reference to the accompanying drawings. Furthermore, in the drawings illustrating the embodiments of the present invention, elements having like functions will be denoted by like reference numerals and details thereon will not be repeated.

Since those skilled in the art may implement various applications of the present invention through the embodiments in this specification, certain embodiments disclosed in the detailed descriptions of the present invention are merely examples for further clearly describing the present invention, and it is not intended to limit the scope of the present invention to the embodiments.

In this specification, a user terminal device is generally a device including at least one of a processor unit, a memory unit and a display unit. The user terminal device includes a cellular phone, a tablet computer, a personal computer or the like.

In this specification, a web description language includes all the languages for creating a web document, such as HyperText Markup Language (HTML), HyperText Markup Language (HTML) 5, JavaScript, Cascading Style Sheets (CSS) and the like.

Figure 2:
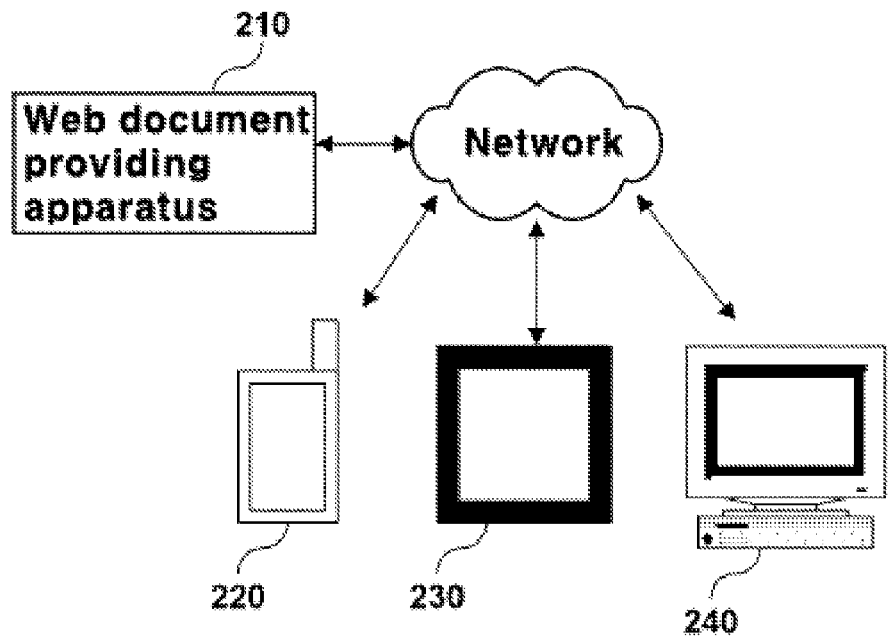
FIG. 2 is a view showing an embodiment of a web scroll system according to the present invention.

An embodiment of a web scroll system according to the present invention is described with reference to FIG. 2.

The web scroll system according to the present invention includes a web document providing apparatus and a user terminal 220, 230 or 240.

The web document providing apparatus is connected to a wired or wireless network and provides a web document to a user terminal device connected through the wired or wireless network. The web document is created in a web description language including HTML and may be stored in a database connected to the web document providing apparatus.

Figure 5:
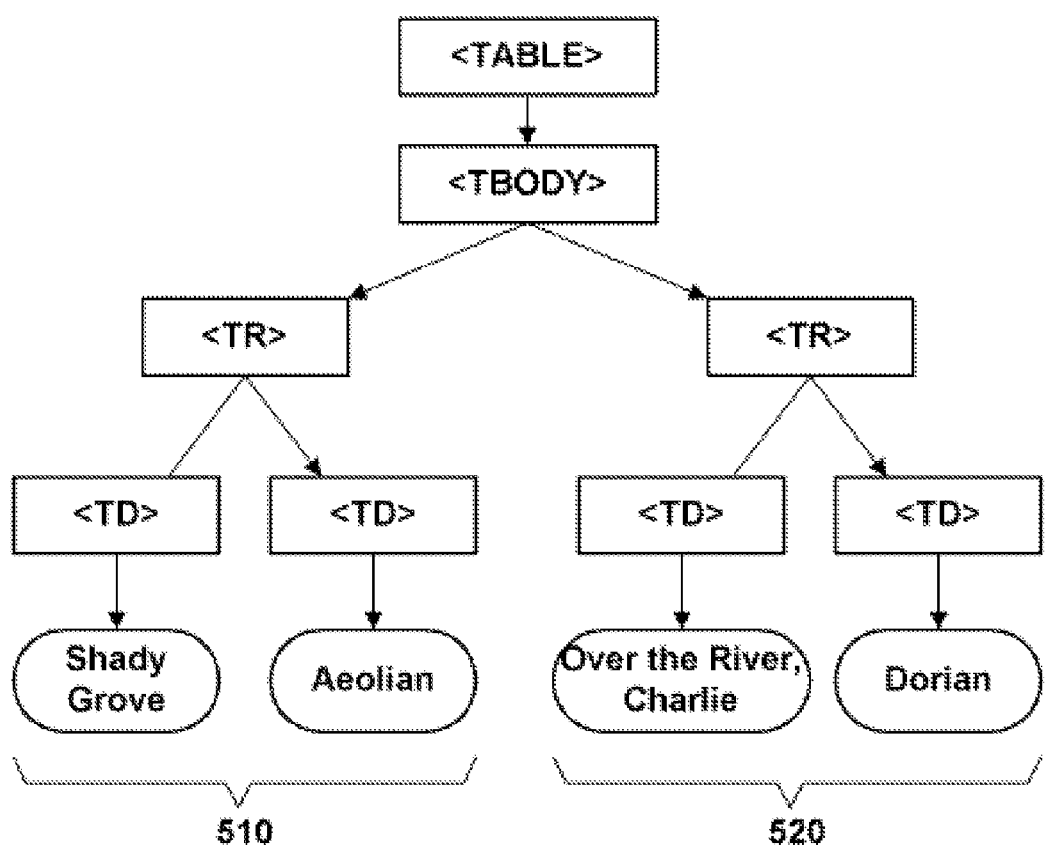
FIG. 5 is a view showing an embodiment of a web document converted into a DOM tree data.

The user terminal 220, 230 or 240 connects to the web document providing apparatus, receives a web document, and parses the provided web document and converts into a DOM tree data as shown in FIG. 5.

The DOM tree data is a format for expressing a document structured using an object-oriented model, which is an official standard of W3C.

The web document converted into a DOM tree data has a structure the same as that of the converted DOM tree data, and non-output nodes except display output nodes corresponding to data that will be output on a display means create a render tree data configured of void nodes.

The render tree data is loaded on video output memory and provided to a web application process.

The data that will be output on the display means is a data separated from the web document converted into the DOM tree data so as to be displayed on the display means, and when the web document converted into the DOM tree data is as large as an amount of data exceeding one page of the display means, it means a data of one page to be currently output on the display means.

Accordingly, if the web document is scrolled, the data that will be output on the display means continuously changes according to the scroll, and the render tree data also changes accordingly.

The web application process is a generic term for a process of an application which can parse a web document and output the parsed web program on the display means among application program processes executed in a processor, and a web browser is also included in the web application.

Meanwhile, the user terminal device may store display non-output nodes in a preset storage space and load the display non-output nodes onto the DOM tree data again when the web application process calls the display non-output nodes. Or, when the web application process calls the display non-output nodes, only the display non-output nodes may be received from the web document providing apparatus and loaded on the DOM tree data.

Figure 10:
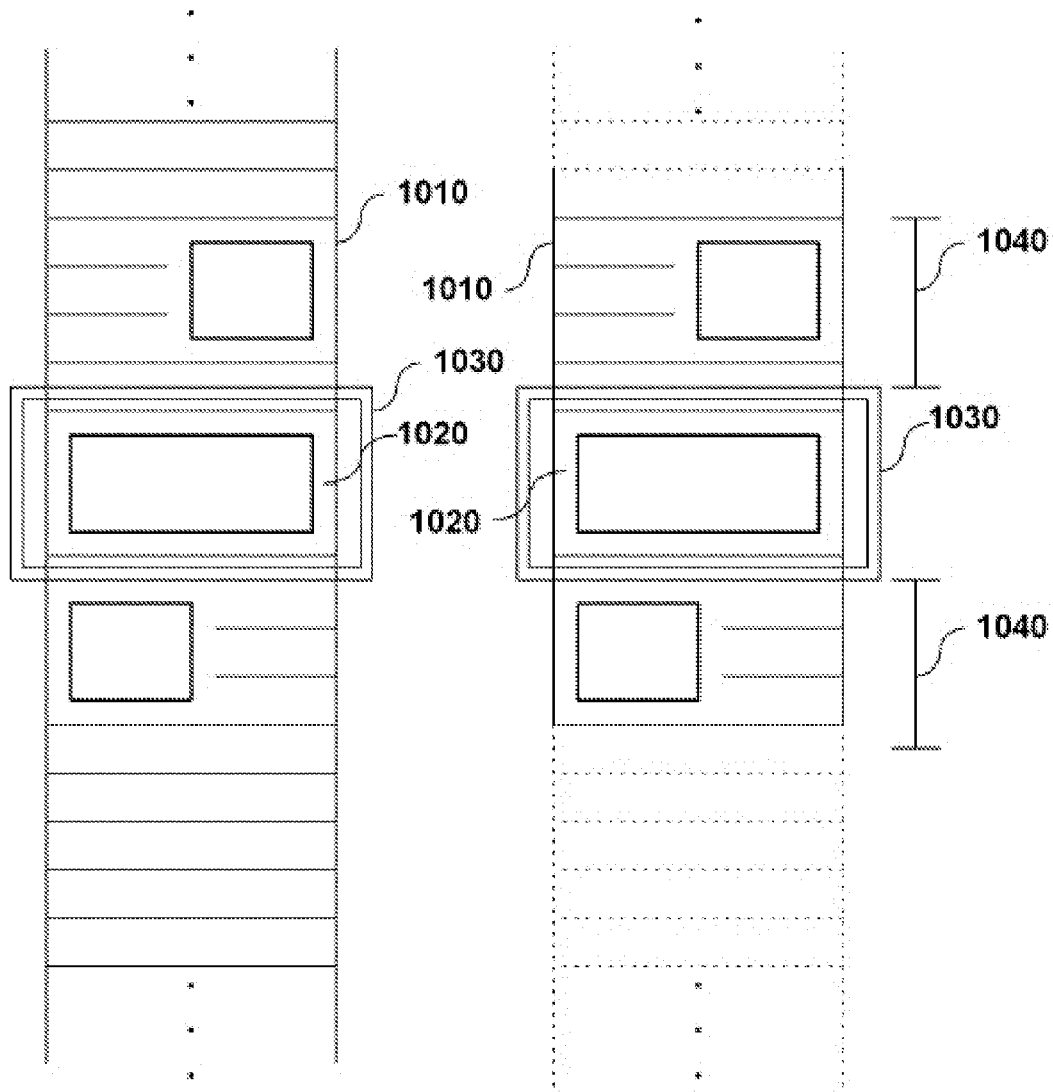
FIG. 10 is a view comparing a web page display method in a conventional user terminal device with an embodiment according to the present invention.

Referring to FIG. 10, FIG. 10(a) is a conceptual view of displaying a web document that the user terminal device 220, 230 or 240 receives by connecting to the web document providing apparatus on a display apparatus according to the prior art, and as shown in FIG. 10(a), the web document has a size larger than a screen (a viewport 1020) of the display apparatus 1030 in most cases.

In addition, if it is not that an end of a web document is determined, but that a predetermined amount of the web document is loaded and a subsequent amount of the web document is loaded again when a user scrolls the web document to the end of the loaded amount, the web document operates the same as shown in FIG. 10(a), and in this case, since the web document is continuously loaded as shown in FIG. 10(a) when the display screen 1030 of the user terminal device shown to the user is exceeded according to scroll input of the user terminal device, a big load is placed on the memory capacity and data processing capability.

Accordingly, as shown in FIG. 10(b), the user terminal device according to the present invention removes part of data excluding the data currently displayed on the viewport or expected to be displayed within a predetermined time from the display output memory until the web application process requests to display the data again on the display apparatus.

Referring to FIG. 10(b), the data expected to be displayed within a predetermined time is part of the web document within a predetermined first distance from the part of the web document currently displayed on the viewport.

The first distance may mean an absolute coordinate distance as shown in FIG. 10(b) since coordinates of a specific node of a DOM tree data positioned in the web document can be calculated when the web document is displayed as shown in FIG. 10(b).

Or, the DOM tree data has a structure formed in the shape of a tree as shown in FIG. 5, and a node in the neighborhood of a data node (a display output node) currently output on the display apparatus is a portion positioned near the web document when the web document is displayed as shown in FIG. 10 (b). Accordingly, since a distance between nodes may be calculated from the DOM tree data of a tree shape and a node positioned within the first distance 1040 from the display output nodes is expected to be displayed within a predetermined time, nodes farther than the first distance 1040 from the display output nodes are removed from the display output memory until the web application process requests to display the nodes again on the display apparatus.

Removing the display non-output nodes from the display output memory is replacing the display non-output nodes with void nodes after the processor unit copies nodes the same as the display non-output nodes from the DOM tree data and stores the copied nodes in a preset storage space.

Or, it may be replacing the display non-output nodes with blank nodes without storing the copied nodes in a preset storage space by the processor unit. In this case, if the web application process calls the display non-output nodes, only the display non-output nodes may be received from the web document providing apparatus and loaded in the DOM tree data or the render tree data.

When the display non-output nodes are removed from the DOM tree data, the processor unit may insert scroll mark nodes at data structure positions corresponding to the display non-output nodes of the DOM tree data.

The scroll mark nodes may be configured of nodes different from each other, including a start scroll mark node and an end scroll mark node and make it easy to reload the display non-output nodes to the DOM tree data or the render tree data according to a call of the web application process to output the display non-output nodes on the display apparatus.

If a call for outputting the display non-output nodes on the display apparatus is received from the web application process due to the scroll of the user, the processor unit 330 may load again the display non-output nodes removed from the memory and insert in the DOM tree data or the render tree data.

Inserting the display non-output nodes into the DOM tree data means copying the display non-output nodes to the blank nodes of the DOM tree data where the display non-output nodes are originally positioned.

Figure 3:
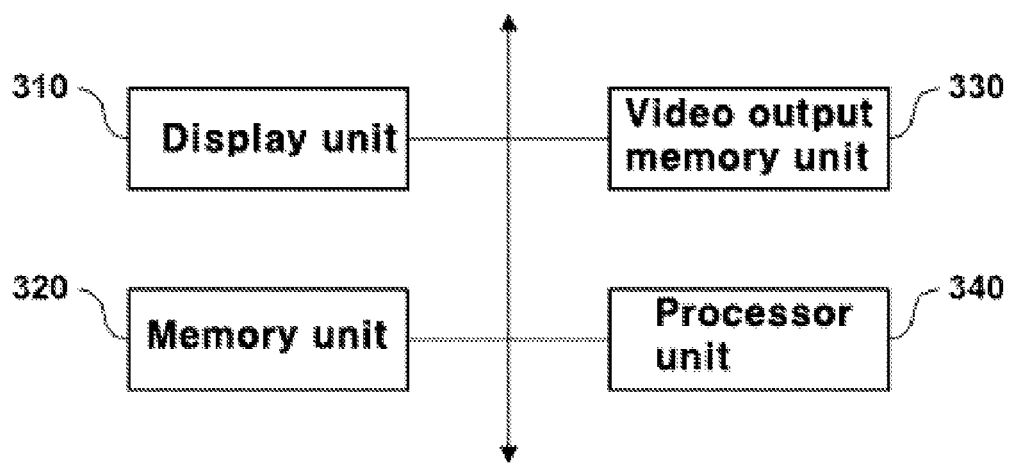
FIG. 3 is a view showing an embodiment of a user terminal device according to the present invention.

Referring to FIG. 3, an embodiment of a user terminal device according to the present invention is described.

The user terminal device according to the present invention includes a display unit 310, a video output memory unit 330, a memory unit 320 and a processor unit 340.

The display unit 310 is an output means for displaying an operation state and an operation result of the user terminal device or providing information to a user, which displays information input by a user or information provided to the user, including various kinds of menus. That is, the display unit 310 may provide a graphic user interface (GUI) of an application executed by the processor unit 340 of the user terminal device.

The display unit 310 may be configured in the form of a panel such as an LCD or may be implemented to be able to input in the form of a touch LCD.

The video output memory unit 330 is memory for recording and reading information to be output on the display unit 310, and the video output memory unit 330 can be configured to be independent from the system memory or configured by allocating a video output area within the system memory if the system memory is shared memory.

The video output memory unit 330 is video buffer memory separate from the system memory and may be configured of memory having an input and output speed faster than that of the system memory.

In addition, the memory unit 320 or the video output memory unit 330 may be a volatile memory element or a non-volatile electromagnetic storage device.

Although the processor unit 340 may be a general-purpose central processing unit (CPU), it can be a programmable device element (CPLF or FPGA) or an application specific integrated circuit (ASIC) implemented to be appropriate for a specific purpose.

Figure 6:
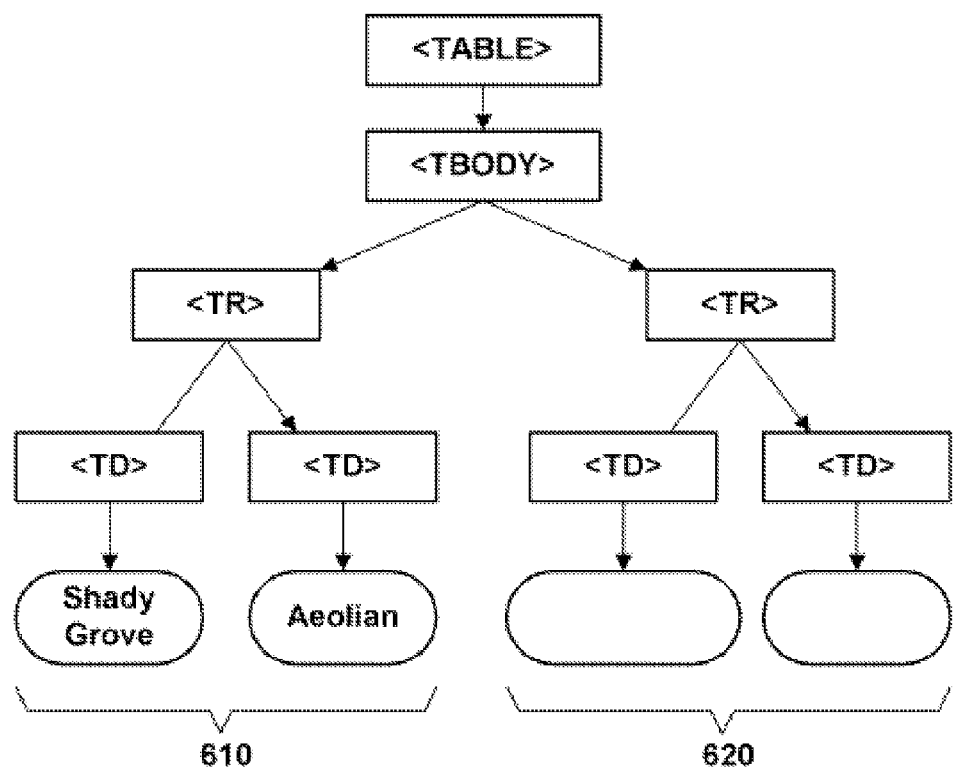
FIG. 6 is a view showing an embodiment of a web document converted into a render tree data according to the present invention.

The processor unit 340 executing a web application process parses a web document configured to include HTML and converts into a DOM tree data having a structure formed in the shape of a tree as shown in FIG. 6.

In addition, the processor unit 340 creates a render tree data having a structure like the converted DOM tree data using the converted DOM tree data, in which non-output nodes excluding display output nodes corresponding to data that will be output on the display unit 310 are configured as void nodes.

Then, the processor unit 340 loads the render tree data on the video output memory unit 330 and provides the render tree data to the web application process, and the web application process or a separate graphic processor renders and outputs the render tree data on the display unit 310.

If a result of converting into a DOM tree data is as shown in FIG. 5, the render tree data has a structure like that of the DOM tree data as shown in FIG. 6.

However, since the data that will be output on the display means among the DOM free data is limited, if only some of data nodes 510 among the DOM tree data as shown in FIG. 5 are output on the display means, the non-output nodes 520 excluding the data nodes 510 output on the display means are configured as void nodes, and the render tree data is created as shown in FIG. 6.

In this case, the processor unit 340 may store the DOM tree data in memory having a speed lower than that of the video output memory unit 330.

Accordingly, even when the user terminal device has the video output memory unit 330 of a small capacity, in a web document of a large volume, the render tree node, in which nodes excluding the nodes corresponding to an area output on the display unit 310 are configured of void nodes, is processed by the video output memory unit 330, and the other DOM tree data is stored in the system memory, and thus the web document may be displayed in a speedy way.

That is, when the DOM tree data is rendered and output in an area (viewport) output on the display unit 310, an output time is proportional to the complexity (number of nodes) of the DOM tree data, and since operation capability of a processor unit is considerably lower than that of a general computer in the case of a mobile terminal, a lot of time is consumed to scroll a web page having a large amount of data converted into the complex DOM tree data.

Contrarily, when a web document is output on a viewport using a rendering data having a structure and nodes according to the present invention, since the application process configures nodes excluding data nodes output on the viewport as void nodes, the viewport output speed is improved, and thus even a mobile terminal with a low operation capability may provide a user with a smooth user environment, and since it is not that all the data are configured and output as valid nodes even when a web user scrolls a web browser, it has an effect of preventing scroll delay.

In addition, since a header mark for indicating a void node is assigned to each of the void nodes of the render tree data, searching for all the nodes is prevented, or the void nodes may be distinguished from the nodes output on the display means.

Figure 7:
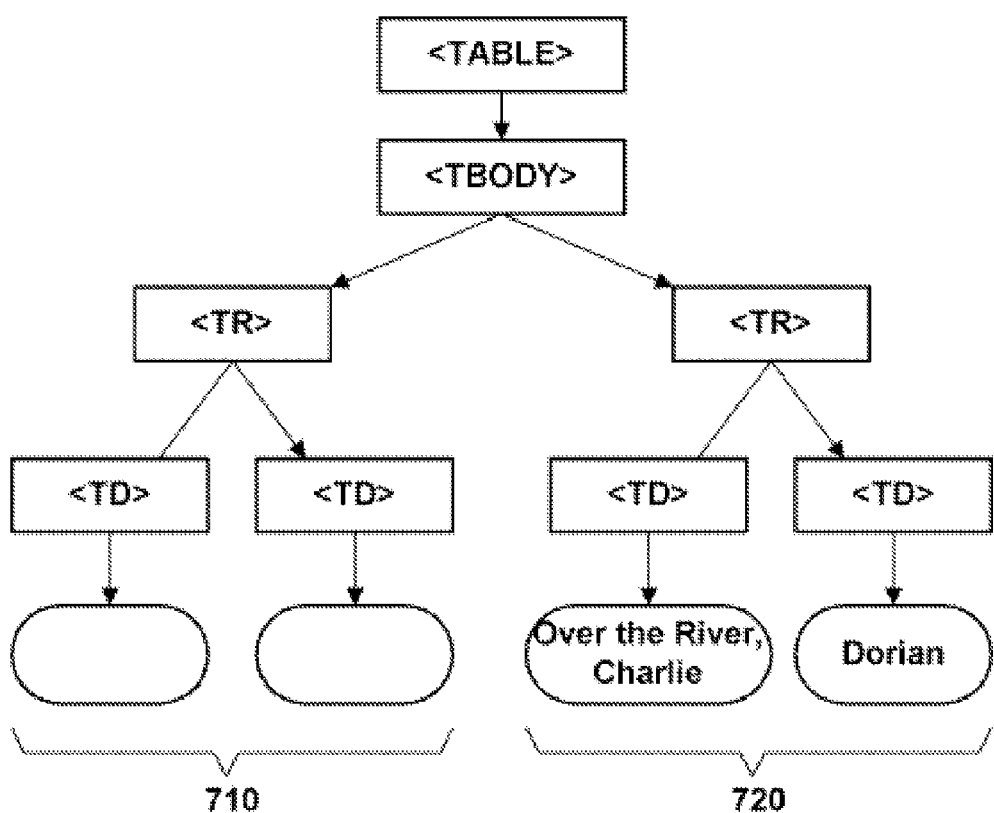
FIG. 7 is a view showing an embodiment of a web document converted into a render tree data according to the present invention.

Referring to FIG. 7, the render tree data may be changed according to web browser scroll of the user.

For example, after only some of data nodes 510 among the DOM tree data as shown in FIG. 5 are output on the display means, and the render tree data is created such that the non-output nodes 520 excluding the data nodes 510 output on the display means are configured as void nodes as shown in FIG. 6, if the data output on the display means are replaced with some other nodes 520 according to web browser scroll of the user, the non-output nodes 510 excluding the data nodes 520 output on the display means are configured as void nodes, and the nodes 520 to be output on the display means are copied from the DOM tree data to the nodes 620 which are previously void nodes, and thus the render tree data is also reconfigured as shown in FIG. 7.

Figure 8:
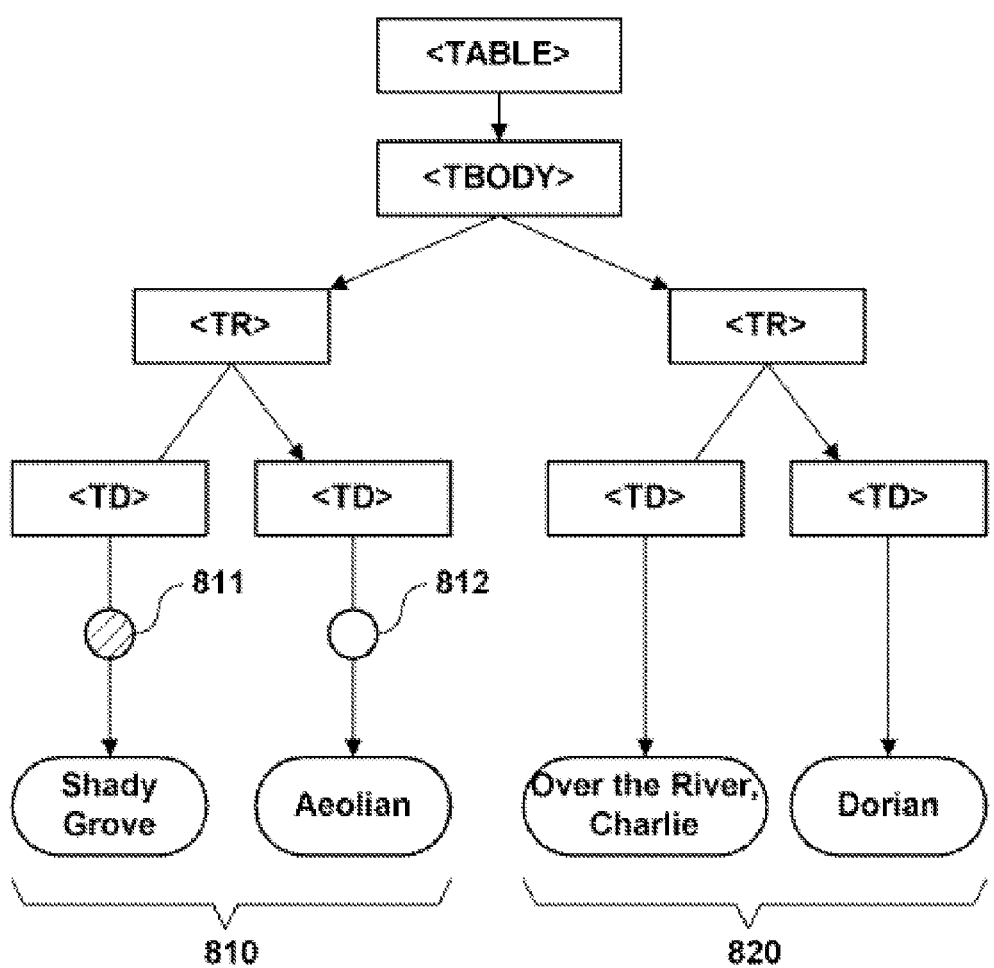
FIG. 8 is a view showing an embodiment of a data configuration inserting a scroll mark node in a DOM tree data according to the present invention.

In addition, describing another example with reference to FIG. 8, when the render tree data is created, the processor unit 340 may insert scroll mark nodes 811 and 812 at data structure positions in the DOM tree data corresponding to the display output nodes of the render tree data and then store the DOM tree data.

The scroll mark data may be formed to be the same as a node of the DOM tree data converted from a web document or may be a node having a different data structure, and it is sufficient to have a mark indicating that the node is a scroll mark node.

In addition, the scroll mark node is inserted at a node position (a position in a data structure corresponding to a display output node) in the DOM tree data having a pointer to a display output node of the render tree data, and the scroll mark node may be a node configured of a start scroll mark node and an end scroll mark node so as to know the start and the end of a position where the display output node of the render tree data is placed.

Accordingly, it is easy to access to nodes of the DOM tree data corresponding to the display output nodes of the render tree data using the scroll mark nodes even after the render tree data is created.

Figure 9:
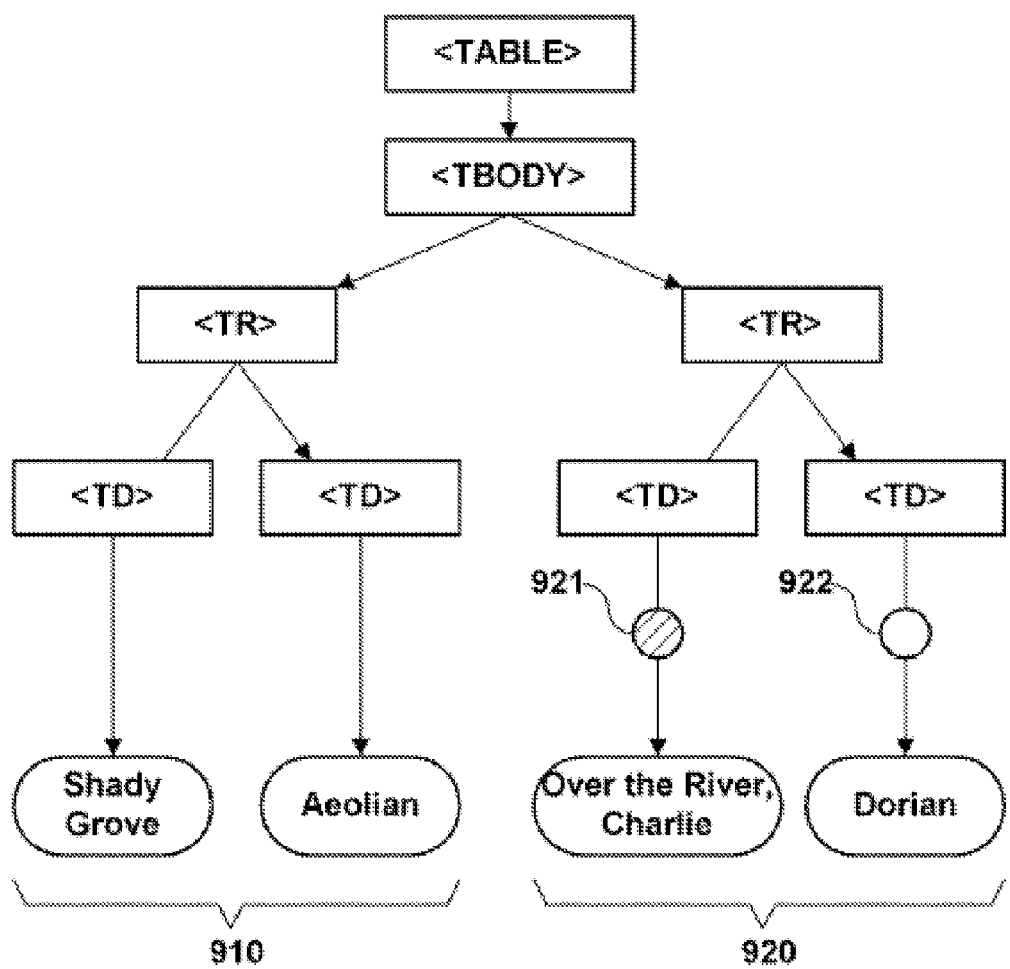
FIG. 9 is a view showing an embodiment of a data configuration inserting a scroll mark node in a DOM tree data according to the present invention.

Referring to FIGS. 7 to 9, if it is requested from the web application process to change a data that will be output on the display unit 310, the processor unit 340 may delete nodes getting out of the viewport among the display output nodes of the render tree data, copy nodes that will be newly output on the viewport among the DOM tree data to the render tree data, load the copied nodes on the display output node, and provide the nodes to the web application process.

If the render tree data created from the DOM tree data converted from a web document is as shown in FIG. 6 and, after the scroll mark nodes 811 and 812 are inserted at data structure positions in the DOM tree data corresponding to the display output nodes of the render tree data, a request including a scroll event for changing data that will be output on the display unit 310 is received through the web application process of the user terminal device, the processor unit 340 may grasp a direction of the scroll event in the web document output on the viewport and how much of the web document will be scrolled and may search for the scroll mark data 811 and 812 from the DOM tree data.

Then, the processor unit 340 may copy needed nodes from the DOM tree data to the render tree data using the scroll mark nodes 811 and 812 and load the copied nodes on the output memory.

In this case, the processor unit 340 may move and insert again the scroll mark data 921 and 922 at the positions of the display output nodes in the DOM tree data.

Accordingly, even when the contents area of the web application is larger than the size of the display unit 310 or the size of a user interface window of the web application and thus a scroll is performed, corresponding new data may be easily loaded on the output memory unit 330 and displayed on the display unit 310 or the user interface window of the web application.

Another embodiment of the user terminal device according to the present invention is described.

The user terminal device according to the present invention includes a display unit 310, a video output memory unit 330, a memory unit and a processor unit 340.

The display unit 310 may provide a graphic user interface (GUI) of an application executed in the processor unit 340 of the user terminal device.

The video output memory unit 330 is memory for recording and reading information to be output on the display unit 310, and it can be configured to be independent from the system memory or configured by allocating a video output area within the system memory.

Although the processor unit 340 may be a general-purpose central processing unit (CPU), it can be a programmable device element (CPLF or FPGA) or an application specific integrated circuit (ASIC) implemented to be appropriate for a specific purpose.

The processor unit 340 measures complexity of the web document converted into a DOM tree data.

When a scroll event is processed and displayed based on a graphic processing unit (GPU) as a configuration of the processor unit 340 in the user terminal equipment, a scroll using the GPU performs a texture upload operation for drawing a picture on the video buffer memory in order to render the contents that will be newly displayed in a display area of the display unit 310 or in an area of a graphic user interface window. Since the texture upload is an operation of great time delay, a method of separating and storing display output tree data in the video output memory for scroll of all web documents may generate a phenomenon of discontinuous scroll when a large image is stored or a lot of images are stored.

Accordingly, only when a ratio of text in a provided web document exceeds a preset value after the web document is converted into a DOM tree data having a structure formed in the shape of a tree, the render tree data is created from the DOM tree data and loaded on the video output memory unit 330 to be provided to the web application process.

Figure 4:
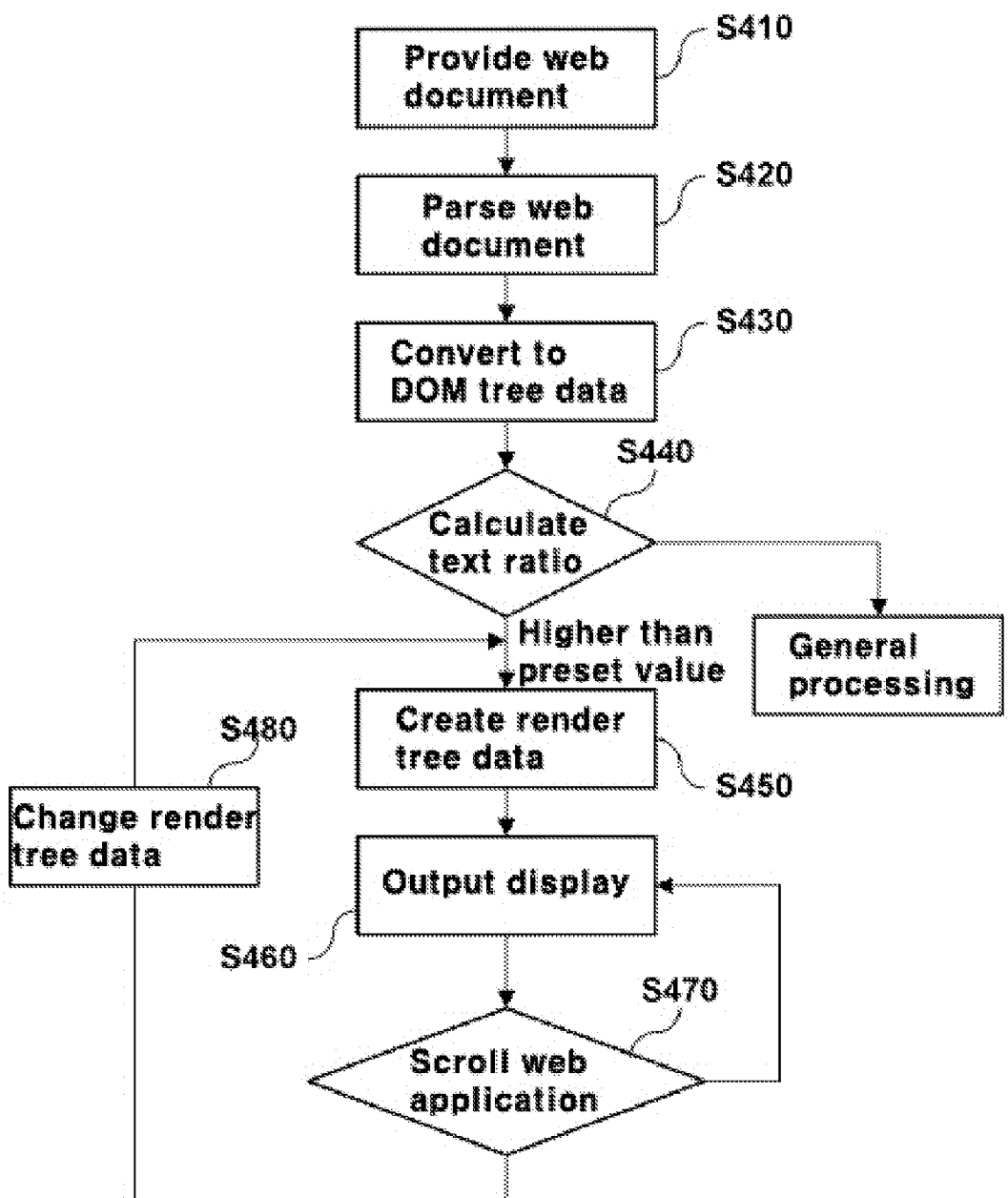
FIG. 4 is a view showing an embodiment of a web document scrolling method of a user terminal device according to the present invention.

A web document scrolling method of the user terminal device is described with reference to FIG. 4.

The processor unit 340 executes processes including a web application process and is provided with a web document configured to include HyperText Markup Language (HTML) S410.

The process parses the web document S420 and converts into a DOM tree data having a structure formed in the shape of a tree S430. Then, a render tree data having a structure like that of the DOM tree data is created from the converted DOM tree data such that non-output nodes excluding display output nodes corresponding to data that will be output on the display means are configured as void nodes, and the render tree data is loaded on the video buffer memory to be provided to the web application process S450 and output on the display means S460. In this case, nodes farther than a first distance from the display output nodes may be set as the display non-output nodes. In addition, the display non-output nodes may be provided to the web application process after the display non-output nodes are removed from the display output memory.

Meanwhile, the processor unit 340 examines a ratio of text in the provided web document, and only when the ratio exceeds a preset value, the processor unit 340 may convert the DOM tree data into the render tree data and load the render tree data on the video buffer memory S440.

In addition, the processor unit 340 may additionally store the DOM tree data in memory having a speed lower than that of the video buffer memory and insert scroll mark nodes 811 and 812 at data structure positions in the DOM tree data corresponding to the display output nodes of the render tree data and then store the DOM tree data.

The display output nodes means nodes corresponding to data that will be output on the display unit 310 among nodes of the DOM tree data or the render tree data.

The scroll mark nodes may be nodes different from each other, including a start scroll mark node and an end scroll mark node.

If the processor unit 340 receives a request including a scroll event for changing data that will be output on the display unit 310 through the web application process of the user terminal device, the processor unit 340 may grasp a direction of the scroll event in the web document output on the viewport and how much of the web document will be scrolled and may search for the scroll mark data 811 and 812 from the DOM tree data.

Then, the processor unit 340 may copy needed nodes from the DOM tree data to the render tree data using the scroll mark nodes 811 and 812 and load the copied nodes on the output memory to provide the copied nodes to the web application process S480 and S450.

In this case, the processor unit 340 may move and insert again the scroll mark data 921 and 922 at the positions of the display output nodes in the DOM tree data.

Accordingly, even when the contents area of the web application is larger than the size of the display unit 310 or the size of the user interface window of the web application and thus a scroll is performed, corresponding new data may be easily loaded on the output memory unit 330 and displayed on the display unit 310 or the user interface window of the web application.

According to still another embodiment of the present invention, there is provided a recording medium which can be read by an electronic device, the recording medium for recording a web document scroll method of a user terminal device as a program, the method comprising the steps of: (a) executing processes including a web application process and receiving a web document created in a web description language, by a processor unit, (b) parsing the web document and converting into a DOM tree data having a structure formed in a shape of a tree, by the processor unit, and (C) removing display non-output nodes excluding display output nodes corresponding to data that will be output on a display means from display output memory and providing the display output nodes to the web application process, by the processor unit, in which the display non-output nodes are nodes farther than a first distance from the display output nodes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

Since the present invention allows fast web scrolling at a user terminal device, it can be used in a user terminal scrolling a web document including large-volume contents.

The invention claimed is:

1. A user terminal device comprising:
a display unit for displaying an output result of a web application process;
a video output memory unit for storing the output result displayed on the display unit;
a memory unit for storing data including an intermediate operation result according to a process of a processor unit; and
the processor unit for executing processes including the web application process, parsing a provided web document created in a web description language and converting into a DOM tree data having a structure formed in a shape of a tree, creating a render tree data having a structure the same as that of the converted DOM tree data, in which non-output nodes excluding display output nodes corresponding to data that will be output on a display means are configured as void nodes, storing the render tree data in the video output memory unit, and providing the render tree data to the web application process.

2. The apparatus according to claim 1, wherein the processor unit stores the DOM tree data in memory having a speed lower than that of the video output memory unit.

3. The apparatus according to claim 1, wherein if a request for changing the data that will be output on the display unit is received from the web application process, the processor unit replaces non-output nodes which do not output on the display unit any more among the display output nodes of the render tree data with void nodes, copies data that will be output on the display means among the DOM tree data to the render tree data, and then providing the render tree data to the web application process.

4. The apparatus according to claim 1, wherein the processor unit inserts scroll mark nodes at data structure positions in the DOM tree data corresponding to the display output nodes of the render tree data.

5. The apparatus according to claim 4, wherein the scroll mark nodes are nodes different from each other, including a start scroll mark node and an end scroll mark node.

6. A user terminal device comprising:
a display unit for displaying an output result of a web application process;
a video output memory unit for storing the output result displayed on the display unit;
a memory unit for storing data including an intermediate operation result according to a process of a processor unit; and
the processor unit for executing processes including the web application process, parsing a provided web document created in a web description language and converting into a DOM tree data having a structure formed in a shape of a tree, determining a ratio of text in the provided web document, and if the ratio exceeds a preset value, creating a render tree data having a structure the same as that of the converted DOM tree data, in which nodes excluding display output nodes corresponding to data that will be output on a display means are configured as void nodes, storing the render tree data in the video output memory unit, and providing the render tree data to the web application process, and if the ratio of text in the web document does not exceed the preset value, providing the DOM tree data to the web application process.

7. The apparatus according to claim 6, wherein if the ratio of text in the web document exceeds the preset value, the processor unit stores the DOM tree data in memory having a speed lower than that of the video output memory unit.

8. The apparatus according to claim 6, wherein if the ratio of text in the web document exceeds the preset value, the processor unit inserts scroll mark nodes at data structure positions in the DOM tree data corresponding to the display output nodes of the render tree data.

9. The apparatus according to claim 8, wherein the scroll mark nodes are nodes different from each other, including a start scroll mark node and an end scroll mark node.

10. The apparatus according to claim 6, wherein in a case where the ratio of text in the web document exceeds the preset value, if a request for changing the data that will be output on the display unit is received from the web application process, the processor unit replaces non-output nodes which do not output on the display unit any more among the display output nodes of the render tree data with void nodes, copies data that will be output on the display means among the DOM tree data to the render tree data, and then providing the render tree data to the web application process.

11. A web scroll system including a user terminal device, the system comprising:
a web document providing apparatus for storing a web document created in a web description language and providing the web document to the user terminal device according to connection of the user terminal device; and
the user terminal device having a processor for connecting to the web document providing apparatus and receiving the web document, parsing the provided web document created in a web description language and converting into a DOM tree data having a structure formed in a shape of a tree, creating a render tree data having a structure the same as that of the converted DOM tree data, in which non-output nodes excluding display output nodes corresponding to data that will be output on a display means are configured as void nodes, and providing the render tree data to a web application process.

12. The system according to claim 11, wherein the user terminal device
i) stores the display non-output nodes in a preset storage space and loads again the display non-output nodes on the DOM tree data when the web application process calls the display non-output nodes, or
ii) receives only the display non-output nodes from the web document providing apparatus and loads again on the DOM tree data when the web application process calls the display non-output nodes.

13. A web document scrolling method of a user terminal device, the method comprising the steps of:
(a) executing processes including a web application process and receiving a web document created in a web description language, by a processor unit;
(b) parsing the web document and converting into a DOM tree data having a structure formed in a shape of a tree, by the processor unit;
(c) creating a render tree data having a structure the same as that of the DOM tree data, in which non-output nodes excluding display output nodes corresponding to data that will be output on a display means are configured as void nodes, by the processor unit; and
(d) loading the render tree data in video buffer memory and providing the render tree data to the web application process, by the processor unit.

14. The method according to claim 13, wherein in the step (b), the processor unit additionally stores the converted DOM tree data in memory having a speed lower than that of the video buffer memory.

15. The method according to claim 13, wherein in the step (c), the processor unit further inserts scroll mark nodes at data structure positions in the DOM tree data corresponding to the display output nodes of the render tree data.

16. The method according to claim 15, wherein the scroll mark nodes are nodes different from each other, including a start scroll mark node and an end scroll mark node.

17. The method according to claim 13, wherein in the step (d), if a request for changing the data that will be output on the display unit is received from the web application process, the processor unit replaces non-output nodes which do not output on the display unit any more among the display output nodes of the render tree data with void nodes, copies data that will be output on the display means among the DOM tree data to the render tree data, and then providing the render tree data to the web application process.

18. The method according to claim 13, wherein a ratio of text in the provided web document is determined, and the step (C) is performed when the ratio exceeds a preset value.

19. A recording medium which can be read by an electronic device, the recording medium for recording a web document scroll method of a user terminal device as a program, the method comprising the steps of:
(a) executing processes including a web application process and receiving a web document created in a web description language, by a processor unit;
(b) parsing the web document and converting into a DOM tree data having a structure formed in a shape of a tree, by the processor unit; and
(C) removing display non-output nodes excluding display output nodes corresponding to data that will be output on a display means from display output memory and providing to the web application process, by the processor unit,
wherein
the display non-output nodes are nodes farther than a first distance from the display output nodes, and
removing the display non-output nodes from the display output memory comprises replacing the display non-output nodes with void nodes after the processor unit copies nodes that are the same as the display non-output nodes from the DOM tree data and stores the copied nodes in a preset storage space.

* * * * *